United States Patent [19]

Lawrence et al.

[11] Patent Number: 4,849,771
[45] Date of Patent: Jul. 18, 1989

[54] PLOTTER PEN PRESENCE AND TYPE IDENTIFICATION SYSTEM

[75] Inventors: James Lawrence, Irvine; Aftab H. Kapadya, Brea, both of Calif.

[73] Assignee: Sanders Associates, Inc., Nashua, N.H.

[21] Appl. No.: 185,967

[22] Filed: Apr. 25, 1988

Related U.S. Application Data

[63] Continuation-in-part of Ser. No. 86,916, Aug. 19, 1987, Pat. No. 4,779,104.

[51] Int. Cl.[4] .................. G01D 15/16; G01D 9/00; G01D 9/30; G06K 7/10
[52] U.S. Cl. ...................... 346/139 R; 346/29; 346/46; 346/49; 346/141; 235/456; 235/462; 235/470
[58] Field of Search .................. 346/139 R, 29, 46, 49, 346/139 A, 139 B, 139 C, 140 R, 141; 364/520; 235/456, 462, 470

[56] References Cited

U.S. PATENT DOCUMENTS 4,677,572 6/1987 Gunderson ........................ 346/49
4,754,288 6/1988 Lawrence ...................... 346/139 R Primary Examiner—E. A. Goldberg
Assistant Examiner—Mark Reinhart
Attorney, Agent, or Firm—Donald A. Streck; Wm F. Porter, Jr.

[57] ABSTRACT

An improvement to graphics pen plotters including a pen gripping mechanism for gripping a cylindrical bodied pen in a generally vertical orientation for sensing the presence and type of a pen in the gripping mechanism with a single sensor. There is a multi-channel sensor adapted for producing and sensing a plurality, "n+1", of parallel light beams disposed one above the other to produce a binary number at an output thereof indicating the ones of the light beams sensed by the sensor. The sensor is disposed to shine the light beams at a position past which the pen is moved by the gripping mechanism. There is also a cylindrical reflective surface disposed about a portion of the body of the pen so as to be struck by the light beams when the pen is being gripped by the gripping mechanism at the position and reflect the light beams back towards the sensor to be sensed thereby. The reflective surfce has "n" cylindrical strip positions disposed to be struck by "n" of the light beams for selectively containing non-reflective strips to indicate a binary indication of the pen type whereby one digit of the binary number output indicates the presence or absence of a pen at the position and the remaining "n" digits of the binary number designate one of $2^n$ possible pen types. Particular size relationships are disclosed providing preferred error-free operation in a low tolerance environment.

12 Claims, 3 Drawing Sheets

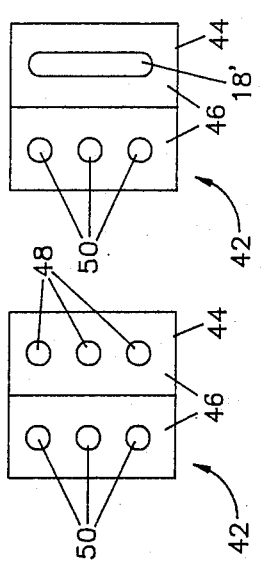
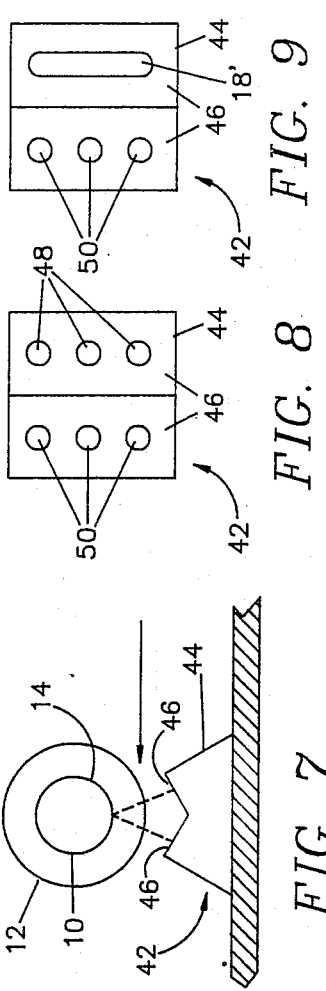
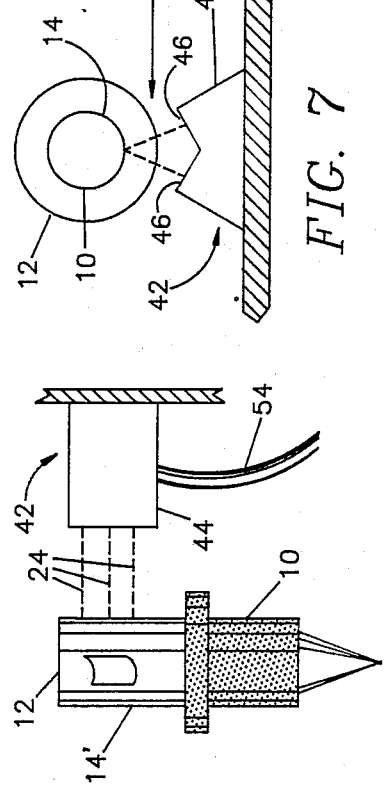
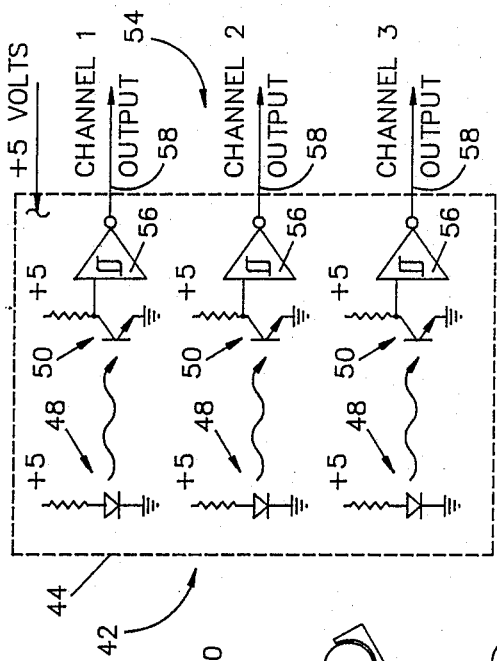
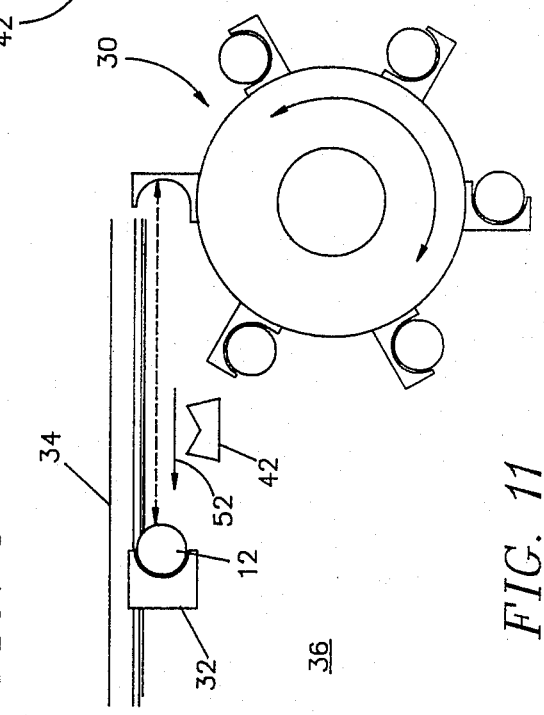

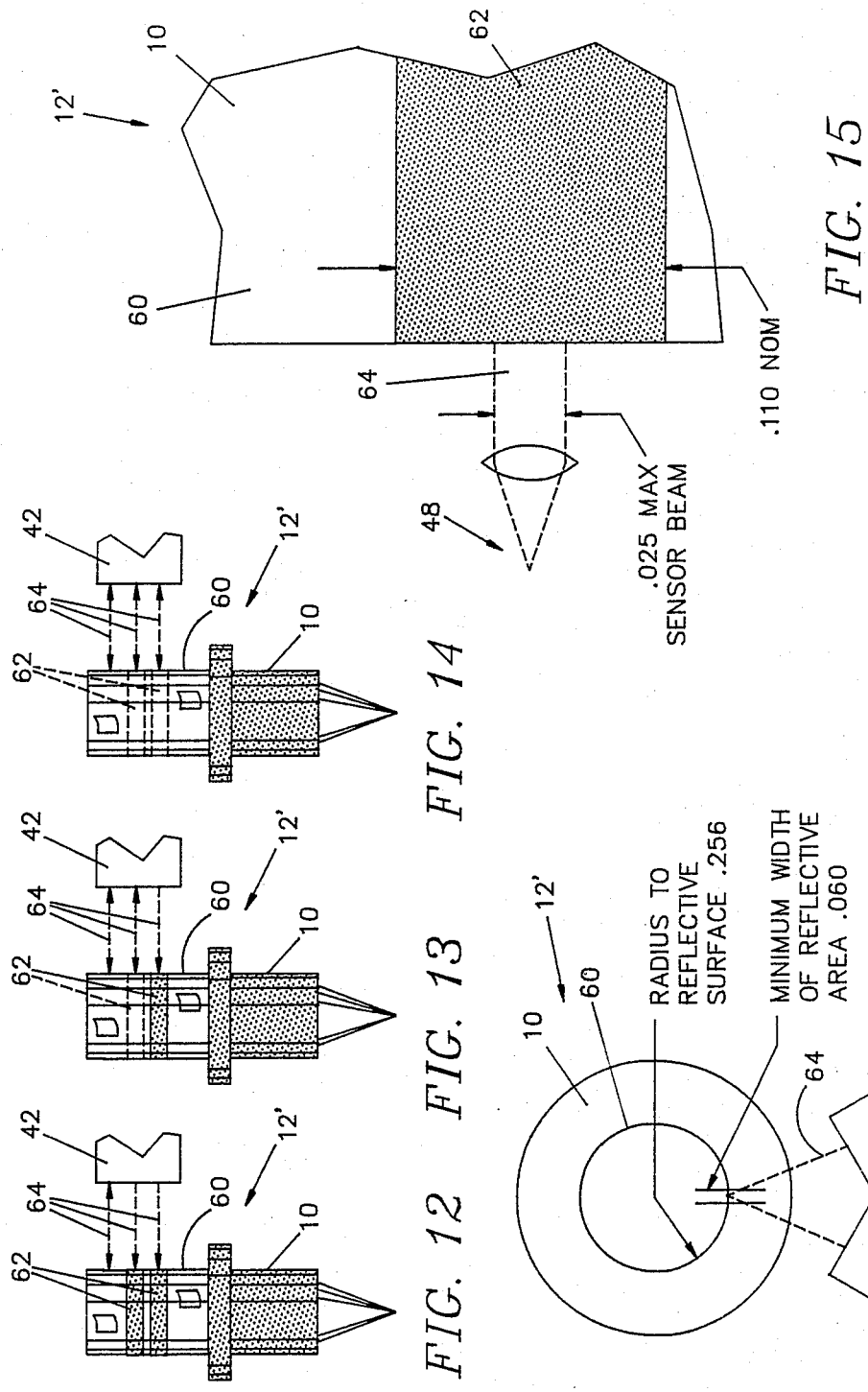

4,849,771

PLOTTER PEN PRESENCE AND TYPE IDENTIFICATION SYSTEM

RELATIONSHIP TO PRIOR APPLICATIONS

This application is a continuation-in-part of application Ser. No. 086,916, filed Aug. 19, 1987, now U.S. Pat. No. 4,779,104, issued Oct. 18, 1988.

BACKGROUND OF THE INVENTION

The present invention relates to pen plotters and systems for sensing pen presence and identification of pen type associated therewith and, more particularly, in a graphics pen plotter including a pen gripping mechanism for gripping a cylindrical bodied pen in a generally vertical orientation, to the improvements of the present invention for sensing the presence and type of a pen in the gripping mechanism comprising, a multi-channel sensor including means for producing and sensing a plurality, "n+1", of parallel light beams disposed one above the other to produce a binary number at an output thereof indicating the ones of the light beams sensed by the sensor, the sensor being disposed to shine the light beams at a position past which the pen is moved by the gripping mechanism; and, a cylindrical reflective surface disposed about a portion of the body of the pen so as to be struck by the light beams when the pen is being gripped by the gripping mechanism at the position and reflect the light beams back towards the sensor to be sensed thereby, the reflective surface having "n" cylindrical strip positions disposed to be struck by "n" of the light beams for selectively containing non-reflective strips to indicate a binary indication of the pen type whereby one digit of the binary number output indicates the presence or absence of a pen at the position and the remaining "n" digits of the binary number designate one of $2^n$ possible pen types.

Modern pen plotters employ a variety of types of pens therein requiring different pen speeds, pen pressures, etc., to create optimum line quality. As a very basic approach, one can provide the plotter with such information prior to the beginning of a plot where a single type of pen is to be employed. Most quality, production grade, commercial plotters, however, employ a multitude of pens even within a single plot for purposes of changing color, line width and the like. Accordingly, it is known in the art to provide each pen with readable indicia so that the pen type can be dynamically determined during the plotting process.

A typical prior art approach to the determination of pen types is shown in FIGS. 1–4. The cylindrical plastic body 10 of each pen 12 is provided with a plurality of strips 14 of reflective tape in a pre-established configuration for each pen type. A sensor system, generally indicated as 16, is used to vertically scan the strips 14 on each pen 12 to determine the pen type. Sensor system 16 comprises a light beam source 18 and a light detector 20 mounted to a moving member 22 so that light 24 striking a strip 14 of reflective tape will be reflected to the light detector 20 to produce a signal on the wires 26. Typically, the source 18 and detector 20 employ modern diode technology; that is, there is a light-emitting diode (LED) within the light beam source 18 and a photo transistor within the light detector 20. The moving member 22 is scanned vertically across the strips 14, as indicated by the arrow 28, by an appropriate mechanism (not shown). Alternatively, of course, the pen 12 could be moved vertically across a stationary sensor to achieve the same results. As those skilled in the art will recognize, if four strips 14 of reflective tape are present at four associated positions on the body 10 of pen 12, the output from the sensor system 16 on wires 26 will be a binary 15, i.e., "1111". By eliminating various ones of the strips 14, the other fifteen possible combinations of four binary bits (i.e., 0000–1110) can be produced. More or less strip positions can, of course, be used as desired for fewer or greater possible numerical designations of type.

The critical portions of interest of a modern pen plotter employing a carousel 30 for holding a plurality of pens is shown in FIG. 4. A pen holder 32 moves back and forth along a support beam 34 within the plotting area 36 when actively plotting. To pick up or change a pen 12, the pen holder 32 moves from the plotting area 36 off station to the carousel 30 as indicated by the dotted arrow 38. To sense pen type, the carousel 30 must be rotated as indicated by the arrows 40 to first position the desired pen 12 adjacent the sensor system 16 wherein it is vertically scanned by sensor system 16 as described above. The carousel 30 is then rotated to place the pen 12 at the pickup position to be picked up by the pen holder 32. As can be appreciated, this is a two-step operation requiring both time and associated logic within the plotting system to accomplish it. Additionally, the sensor system 16 as described above is relatively complex and parts intensive in order to be able to properly vertically scan the strips 14 in the manner previously described.

Moreover, to determine if a pen 12 is in the pen holder 32, a separate sensor (not shown) is typically employed. Thus, there tends to be a redundancy of sensors in the typic While not incorporated into any commercial pen plotters known to the applicants herein or their assignee, the Japanese Patent Application of Watanabe published in Mar. of 1982 as No. 57-45099 (copy filed herewith) depicts in FIGS. 2 (a) and (b) thereof what appears to be three sensors (84) stacked one above the other in spaced relationship so as to read three corresponding sensible strips (94) on a pen (9). Apparently, the intent is to read the three strip positions simultaneously to develop a binary signal between 000 and 111 (depending on the strips actually present) without the need to scan vertically across the strip positions with a single sensor. A representation of the Watanabe approach as it relates to the drawing of FIGS. 1–3 is shown in FIG. 5 hereof.

Wherefore, it is the object of the present invention to provide a pen plotter pen type identification system which is simple in constructions and which can dynamically scan a pen anywhere throughout its path of movement without the requirement of the pen being moved to a separate sensing location or having to stop.

It is another object of the present invention to provide a pen plotter pen type identification system which produces output sensing with discrete TTL switching signal levels.

It is still another object of the present invention to provide a pen plotter pen type identification system which also provides indication of pen presence employing a single sensor for both purposes.

It is yet another object of the present invention to provide a pen plotter pen which is sensible by a single sensor as to both its type and presence.

Other objects and benefits of the present invention will become apparent from the description which follows hereinafter taken in conjunction with the drawings which accompany it.

SUMMARY

The foregoing objects have been attained in a graphics pen plotter including a pen gripping mechanism for gripping a cylindrical bodied pen in a generally vertical orientation, by the improvements of the present invention for sensing the presence and type of a pen in the gripping mechanism comprising, a multi-channel sensor including means for producing and sensing a plurality, "$n+1$", of parallel light beams disposed one above the other to produce a binary number at an output thereof indicating the ones of the light beams sensed by the sensor, the sensor being disposed to shine the light beams at a position past which the pen is moved by the gripping mechanism; and, a cylindrical reflective surface disposed about a portion of the body of the pen so as to be struck by the light beams when the pen is being gripped by the gripping mechanism at the position and reflect the light beams back towards the sensor to be sensed thereby, the reflective surface having "$n$" cylindrical strip positions disposed to be struck by "$n$" of the light beams for selectively containin non-reflective strips to indicate a binary indication of the pen type whereby one digit of the binary number output indicates the presence or absence of a pen at the position and the remaining "$n$" digits of the binary number designate one of $2n$ possible pen types.

In the preferred embodiment, the cylindrical reflective surface has a reflective width "$w$" at the points where it is struck by the light beams from which the light beams can be reflected back towards the sensor to be sensed thereby and the light beams each have a diameter of between $w/3$ and $w/2$.

Further in the preferred embodiment, the light beams each have a diameter "$d$" and the cylindrical strip positions of the cylindrical reflective surface each have a vertical width on either side of the light beam of at least $1.5d$ for a total vertical width of $4d$.

DESCRIPTION OF THE DRAWINGS

FIG. 6 is a simplified side view of a pen presence and type identification system according to the present invention.

FIG. 7 is a top view of the apparatus of FIG. 6.

FIG. 8 is a front view of the sensor of the present invention in its embodiment.

FIG. 9 is a front view of the sensor of the present invention in a alternate embodiment.

FIG. 10 is a circuit diagram of the preferred sensor of the present invention in a three-channel embodiment thereof as employed by the assignee hereof in commercial pen plotters.

FIG. 11 is a plan view in the manner of FIG. 4 showing the pen type identification system of the present invention and its capability for dynamically sensing pen presence and type during the pen pickup procedure.

FIG. 12 is a simplified side view of a pen as intended to be employed in the presence and type identification system of the present invention showing the detection by the sensor of FIG. 8 of pen presence and two negative reflection bands.

FIG. 13 a simplified side view of a pen as intended to be employed in the presence and type identification system of the present invention showing the detection by the sensor of FIG. 8 of pen presen ceand one negative reflection band.

FIG. 14 is a simplified side view of a pen as intended to be employed in the presence and type identification system of the present invention showing the detection by the sensor of FIG. 8 of pen presence and no negative reflection bands.

FIG. 15 is an enlarged side view drawing depicting the relationship of the sensor beam width to the negative reflection band width in the preferred embodiment of the pen of the present invention.

FIG. 16 is an enlarged top view drawing depicting the sensor beam width to negative reflection band reflective width relationship in the preferred embodiment of the pen of the present invention.

DESCRIPTION OF THE PREFERRED EMBODIMENT

Figure 3:
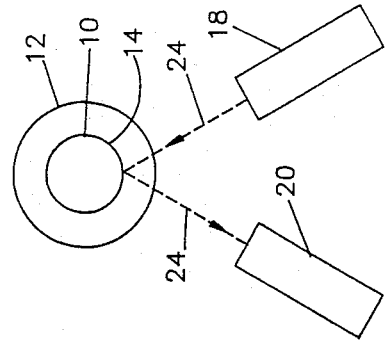
FIG. 3 is a top view showing the way in which the sensor system employed in FIGS. 1 and 2 reflects a light beam from reflective tape indicating strips on the body of a pen.
Figure 2:
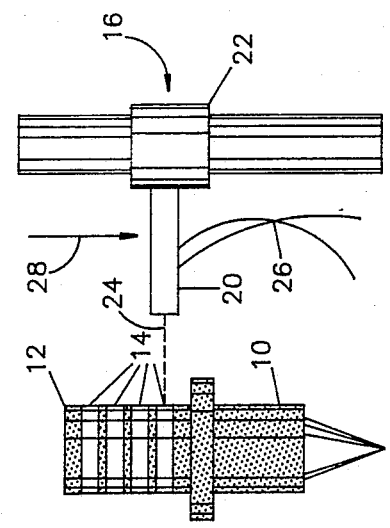
FIG. 2 shows the apparatus of FIG. 1 in the process of being vertically scanned.
Figure 1:
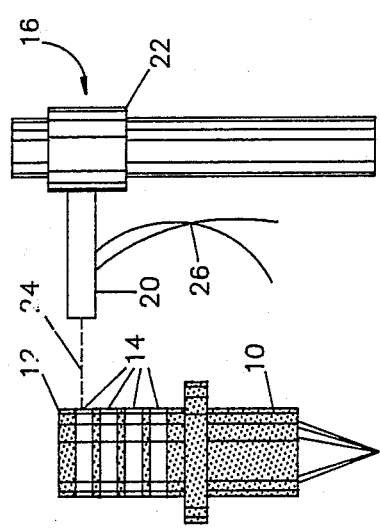
FIG. 1 is a simplified side view of a prior art pen plotter pen type identification system.
Figure 5:
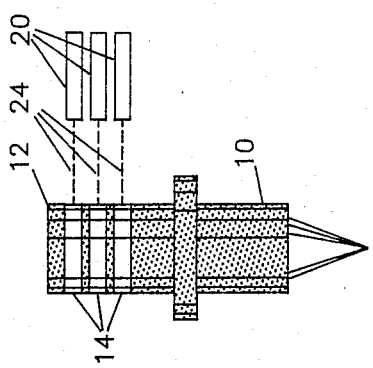
FIG. 5 is a simplified side view of a pen type identification system according to the prior art of the Japanese Patent Watanabe
Figure 4:
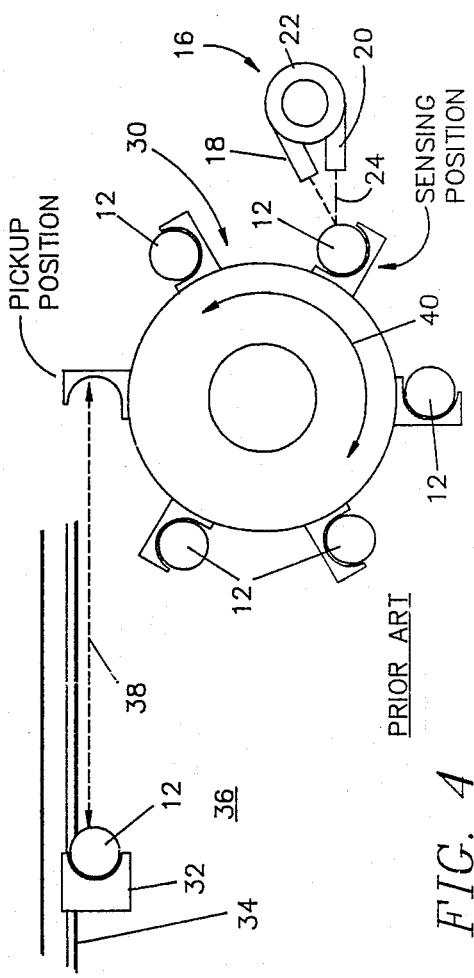
FIG. 4 is a simplified plan view of the critical portions of a carousel-type pen plotter showing the prior art approach for employing the apparatus of FIGS. 1-3 to sense pen type.

The heart of the pen presence and type identification system of the present invention is the multi-channel sensor 42 shown in FIGS. 6-10 and the unique reflective pen body to be described hereinafter with respect to FIGS. 12-15. The sensor 42 is of unitary construction so as to provide automatic and repeatable alignment of multiple adjacent sensing channels while, at the same time, providing ease of assembly within necessary tolerance limits at a low cost-to-manufacture level. There is a body 44 having a pair of angled front faces 46. The body 44 is adapted to be permanently attached to a mounting bracket, case portion, or the like, by any of numerous means well known to those skilled in the art such as adhesive tape, etc., which form no part of the present invention and are, therefore, not shown in the interest of simplicity and the avoidance of redundancy. In the preferred embodiment of FIG. 8, one face 46 is provided with a plurality of vertically disposed light emitting diodes (LEDs) 48 while the other is provided with a plurality of opposed photo transistors 50. In an alternate embodiment as shown in FIG. 9, a single light source 18' can be employed on one face 46, if desired.

As can best be seen from FIG. 6, the multi-channel sensor 42 creates a plurality of light beams 24 directed at the upper portion of the body 10 of the pen 12 to be reflected back at the sensor 42 in a unique manner to be described in detail shortly. Thus, the sensor 42 can be easily and permanently affixed adjacent the path of the pens 12 as shown in FIG. 11. As thus mounted, as a pen 12 is moved past the sensor 42 following pickup from the carousel 30, as indicated by the arrow 52, it is moved past the sensor 42 causing the presence of the pen and an associated binary type configuration as sensed by the photo transistors 50 to be output on output line 54 dynamically as the pen 12 moves past the sensor 42. It should be well noted that employing the sensor 42 of the present invention, the pen 12 does not have to be moved to any special point for sensing. Sensing can take place anywhere the pen 12 moves past in its normal travel. This, of course, would include positions along the path of rotation of the carousel 30 where the pen presence and type at each position could be determined as the pens were rotated past the point on the carousel 30.

The preferred circuitry for the sensor 42 to achieve the stated objectives is shown in FIG. 10. In the preferred embodiment, the components are all included within the body 44. Each channel comprises an infra red LED 48 and an associated photo transistor 50. The output from the photo transistor 50, in each case, is connected as an input to a Schmitt trigger 56, the output 58 of which is the output of the channel. The manner of operation of such devices are well known in the art and, therefore, in the interests of simplicity and to avoid redundancy, no further detail will be provided. In the preferred embodiment, the output from the Schmitt trigger 56 (i.e., the output from each channel) is greater than or equal to 2.4 volts in the presence of a reflective surface directing light 24 from the LED 48 onto the photo transistor 50 and less than or equal to 0.5 volts for dark bands (i.e., no tape strip 14 on the body 10 at the associated position) or when no pen is present. Further in the preferred embodiment, the rise time for each channel output is to be no more than 25 microseconds, where the rise time of a channel is defined as the time it takes for any channel output voltage to go from 10% to 90% of the final voltage level. Propagation delay for each channel output in the preferred embodiment is to be no more than 200 microseconds, where propagation delay is defined as the time it takes any channel to change its output state after the sensing of bands of a reflective surface.

Turning to FIGS. 12-15, the unique approach to the pens employed with the system of the present invention to provide both pen presence and pen type identification with the single, multi-channel sensor as previously described herein will now be described in detail. The pen 12' of the present invention operates on a negative reflection basis; that is, while the prior art as typified by the Watanabe approach as described above senses the presence of positive reflective strips, the pen 12' of the present invention has a reflective surface 60 disposed over the upper portion of the body 10 and incorporates negative, i.e. non-reflecting, strips 62 therein to indicate pen type. By providing "n+1" non-reflecting strip positions on the surface 60 and "n+1" channels in the multichannel sensor 42, the output of the sensor 42 can be employed to indicate both pen presence and pen type, as desired. In the commercial embodiment of the present invention as manufactured and sold by the assignee hereof and as depicted in FIG. 12, each pen 12' has the potential for two negative strips 62 and the associated sensor 42 has three channels as previously described herein with respect to FIGS. 8-10. Thus, in addition to pen presence, four pen types (i.e. 00, 01, 10 and 11) can be detected.

When scanning vertically across positive reflective strips as in the prior art described earlier herein, strip width and separation is not a critical factor. As long as there is sufficient spacing between the adjacent reflective strips 14 to prevent signal overlap, a proper reading of the pen type can be achieved. Such was found to be not the case with the unique horizontal scanning system of the present invention. When constructed and built, it was found that as the pen 12' is gripped in the various mechanisms, any misalignment or tipping/tilting of the pen at the point of sensing or misapplication of the reflective surface 60 resulting from wide tolerances in the application process could cause misreading. To prevent the need to employ close tolerances with accompanying high labor intensity and high manufacturing costs, it was found after experimentation with the relationship of the reflective portions of the reflective surface 60 to the characteristics of the sensor beams 64 of sensor 42 that these factors could be employed to control the problem. The findings as incorporated into the commercial embodiment of the assignee herein are depicted in FIGS. 15 and 16.

Each LED 48 within the sensor 42 is configured to produce a cylindrical sensor beam 64 of 0.025 inch maximum diameter as depicted in FIG. 15. This is dictated by the width of the reflective area on the reflective surface 60 as depicted in FIG. 16. The radius to the reflective surface is 0.256 inch and fixed by the standard pen body size employed. This provides a width of reflective area of 0.060 inch minimum. The beam 64 forms a 45 degree angle as it leaves one face 46 and enters the other face 46. To provide sufficient room for misalignment without loss of signal it was found that the width of the reflective area of the reflective surface should be two to three times the beam width. Thus, in the preferred embodiment, the beam width of 0.025 inch maximum puts it right in the middle, i.e. the reflective area is 2.5 times the beam width.

The other aspect of concern is the width of the negative reflective strips 62 to the beam width. If the sensor beam 64 touches any portion of the reflective surface 60 a reflected return signal will be developed which will supercede the actual presence of a non-reflecting strip 62. As described above, the preferred beam width of 0.025 inch is dictated by the fixed reflective width of the reflective surface 60. Thus, as between the width of the negative reflective strips 62 and the width of the beam 64, the only adjustable factor is the width of the strips 62. To provide a sufficient buffer of strip 62 on either side of the nominal center position of the beam 64 for the amount of misalignment determined to be average through testing, it was determined that the buffer should be at least 1.5 times the width of the beam 64. For safety in the preferred embodiment, the factor was made approximately 1.7. Thus, as depicted in FIG. 15, each non-reflective strip 62 has a nominal width of 0.110 inch. As can be appreciated from the comment above with respect to any reflection from the surface 60 causing a positive signal out, the spacing between strips 62 is not critical. In the commercial embodiment of the present invention, the three beams 64 are spaced at approximately 0.200 inch intervals.

Thus, it can be seen that the pen plotter pen presence and type identification system and associated pen configuration of the present invention as hereinbefore described has successfully achieved its stated objectives. Dynamic pen presence and type sensing can be accomplished with a simple, multi-channel, non-moving sensor positioned anywhere along the normal path of movement of the pen between the carousel and the plotting area.

Wherefore, having thus described our invention, we claim:

1. In a graphics pen plotter including a pen gripping mechanism for gripping a cylindrical bodied pen in a generally vertical orientation, the improvement for sensing the presence and type of a pen in the gripping mechanism comprising:
   (a) a multi-channel sensor including means for producing and sensing a plurality, "n+1", of parallel light beams disposed one above the other to produce a binary number at an output thereof indicating the ones of said light beams sensed by said sensor, said sensor being disposed to shine said light beams at a position past which the pen is moved by the gripping mechanism; and,
   (b) a cylindrical reflective surface disposed about a portion of the body of the pen so as to be struck by said light beams when the pen is being gripped by the gripping mechanism at said position and reflect said light beams back towards said sensor to be sensed thereby, said reflective surface having "n" cylindrical strip positions disposed to be struck by "n" of said light beams for selectively containing non-reflective strips to indicate a binary indication of the pen type whereby one digit of said binary number output indicates the presence or absence of a pen at said position and the remaining "n" digits of said binary number designate one of $2^n$ possible pen types.

2. The improvement of claim 1 wherein:
   (a) said cylindrical reflective surface has a reflective width "w" at the points where it is struck by said light beams from which said light beams can be reflected back towards said sensor to be sensed thereby; and,
   (b) said light beams each have a diameter of between w/3 and w/2.

3. The improvement of claim 2 wherein:
   said light beams each have a diameter of w/2.5.

4. The improvement of claim 1 wherein:
   (a) said light beams each have a diameter "d"; and,
   (b) said cylindrical strip positions of said cylindrical reflective surface each have a vertical width on either side of said light beam of at least 1.5 d for a total vertical width of 4 d.

5. The improvement to a pen for use in a graphics pen plotter having a pen gripping mechanism for gripping a cylindrical bodied pen in a generally vertical orientation and a multi-channel sensor producing and sensing a plurality, "n+1", of parallel light beams disposed one above the other to produce a binary number at an output thereof indicating the ones of the light beams sensed by the sensor when the sensor is disposed to shine the light beams at a position past which the pen is moved by the gripping mechanism whereby the output of the sensor indicates both pen presence and pen type, comprising:
   a cylindrical reflective surface disposed about a portion of the body of the pen so as to be struck by the light beams when the pen is being gripped by the gripping mechanism at the position and reflect the light beams back towards the sensor to be sensed thereby, said reflective surface having "n" cylindrical strip positions disposed to be struck by "n" of the light beams for selectively containing non-reflective strips to indicate at the output of the sensor a binary number indication of the pen type whereby one digit of said binary number output indicates the presence or absence of a pen at the position and the remaining "n" digits of said binary number designate one of $2^n$ possible pen types.

6. The improvement to a plotter pen of claim 5 wherein the light beams each have a diameter "d" and wherein additionally:
   said cylindrical reflective surface has a reflective width "w" at the points where it is struck by said light beams from which said light beams can be reflected back towards said sensor to be sensed thereby, said width w being between 3d and 4d.

7. The improvement to a plotter pen of claim 6 wherein:
   said width w is equal to 3.5d.

8. The improvement to a plotter pen of claim 5 wherein the light beams each have a diameter "d" and wherein additionally:
   said cylindrical strip positions of said cylindrical reflective surface each have a vertical width on either side of the light beam of at least 1.5d for a total vertical width of 4d.

9. An improved pen for use in a graphics pen plotter having a pen gripping mechanism for gripping a cylindrical bodied pen in a generally vertical orientation and a multichannel sensor producing and sensing a plurality, "n+1", of parallel light beams disposed one above the other to produce a binary number at an output thereof indicating the ones of the light beams sensed by the sensor when the sensor is disposed to shine the light beams at a position past which the pen is moved by the gripping mechanism whereby the output of the sensor indicates both pen presence and pen type, comprising:
   (a) a hollow cylindrical pen body having a drawing point at a bottom end thereof and containing a writing medium therein communicating with said drawing point; and,
   (b) a cylindrical reflective surfaced material disposed about a portion of said pen body so as to be struck by the light beams when the pen is being gripped by the gripping mechanism at the position and reflect the light beams back towards the sensor to be sensed thereby, said reflective surfaced material having "n" cylindrical strip positions disposed to be struck by "n" of the light beams for selectively containing non-reflective strips of the material to indicate at the output of the sensor a binary number indication of the pen type whereby one digit of said binary number output indicates the presence or absence of a pen at the position and the remaining "n" digits of said binary number designate one of $2^n$ possible pen types associated with the pen.

10. The improved plotter pen of claim 9 wherein the light beams each have a diameter "d" and wherein additionally:
    said cylindrical reflective surface has a reflective width "w" at the points where it is struck by said light beams from which said light beams can be reflected back towards said sensor to be sensed thereby, said width w being between 3d and 4d.

11. The improved plotter pen of claim 10 wherein:
    said width w is equal to 3.5d.

12. The improved plotter pen of claim 9 wherein the light beams each have a diameter "d" and wherein additionally:
    said cylindrical strip positions of said cylindrical reflective surface each have a vertical width on either side of the light beam of at least 1.5d for a total vertical width of 4d.

* * * * *